United States Patent
Wong et al.

(10) Patent No.: US 6,303,067 B1
(45) Date of Patent: *Oct. 16, 2001

(54) METHOD OF STRETCHING FILMS ACCORDING TO AN OVERBIAS OR OVERSTRETCH STRETCH PROFILE

(75) Inventors: Chiu Ping Wong, Vadnais Heights; Thomas P. Hanschen, St. Paul; Anthony B. Ferguson, Lake Elmo; William W. Merrill, White Bear Lake; Fred J. Roska; Jeffery N. Jackson, both of Woodbury, all of MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/192,060

(22) Filed: Nov. 13, 1998

(51) Int. Cl.[7] .......................... B29C 55/14; B29C 55/16; B29C 55/20; B29C 71/02

(52) U.S. Cl. ..................... 264/289.6; 264/210.7; 264/290.2; 264/342 RE; 264/346

(58) Field of Search ............................. 264/210.7, 210.1, 264/290.2, 288.4, 342 RE, 342 R, 235.8, 346, 230, 289.6, 237, 348, 235.6

(56) References Cited

U.S. PATENT DOCUMENTS 2,618,012  11/1952  Milne ......................... 18/1
2,961,711  11/1960  Diedrich et al. ............ 18/48

(List continued on next page.)

FOREIGN PATENT DOCUMENTS

| 2 038 705 | 7/1980 | (DE) . |
| 0 149 878 | 7/1985 | (EP) . |
| 1000361 | 2/1962 | (GB) . |
| 2094 221 | 9/1982 | (GB) . |
| WO 91/00799 | 1/1991 | (WO) . |
| WO 95/33618 | 12/1995 | (WO) . |

OTHER PUBLICATIONS

Fuessel U: "Flachfolien Simultan–Biaxial Strecken" Kunststoffe, vol. 81, No. 10, Oct. 01, 1991, pp. 915–918 XP000297628.

* cited by examiner

Primary Examiner—Jan H. Silbaugh
Assistant Examiner—Michael I. Poe
(74) Attorney, Agent, or Firm—James J. Trussell; Carolyn V. Peters

(57) ABSTRACT

A method of biaxially stretching a polymeric film according to an overbias or overstretch stretch profile to a final first direction stretch parameter and a final second direction stretch parameter to provide a film having uniform properties. First, a sufficiently high temperature is imparted to the film to allow a significant amount of biaxial stretch. The film is then biaxially tenter stretched to a peak first direction stretch parameter that is at least 1.3 times the final first direction stretch parameter wherein the final first direction stretch parameter is no larger than the final second direction stretch parameter. Finally, the film is retracted in the first direction from the peak first direction stretch parameter to the final first direction stretch parameter to produce a film having uniformity of properties in the first direction.

27 Claims, 11 Drawing Sheets

U.S. PATENT DOCUMENTS

| | | | |
|---|---|---|---|
| 3,014,234 | 12/1961 | Koppehele | 18/1 |
| 3,046,599 | 6/1962 | Nicholas et al. | 18/1 |
| 3,057,835 | 10/1962 | Coover, Jr. | 260/93.7 |
| 3,241,662 | 3/1966 | Robinson et al. | 428/343 |
| 3,296,351 * | 1/1967 | Rasmussen . | |
| 3,324,218 | 6/1967 | Gebler et al. | 264/210 |
| 3,502,766 | 3/1970 | Tsuruta et al. | 264/289 |
| 3,816,584 | 6/1974 | Schmidt | 264/289 |
| 3,890,421 | 6/1975 | Habozit | 264/289 |
| 3,903,234 | 9/1975 | Ikeda et al. | 264/210 |
| 3,995,007 | 11/1976 | Nakamura et al. | 264/288 |
| 4,045,515 | 8/1977 | Isaka et al. | 260/897 |
| 4,076,532 * | 2/1978 | Gottemeier | 430/348 |
| 4,134,957 * | 1/1979 | Yoshimura et al. | 264/288 |
| 4,138,459 * | 2/1979 | Brazinsky et al. | 264/154 |
| 4,185,148 | 1/1980 | Sata et al. | 526/348 |
| 4,234,532 | 11/1980 | Motegi et al. | 264/235.8 |
| 4,283,463 | 8/1981 | Shiga et al. | 428/512 |
| 4,330,499 | 5/1982 | von und zu Aufsess et al. | 264/289 |
| 4,335,069 | 6/1982 | Levy | 264/290.2 |
| 4,370,291 | 1/1983 | Kazama et al. | 264/210.7 |
| 4,428,723 | 1/1984 | Thiel et al. | 425/324.1 |
| 4,451,533 * | 5/1984 | Wong et al. | 428/337 |
| 4,513,028 * | 4/1985 | Aritake | 427/173 |
| 4,525,317 | 6/1985 | Okada et al. | 264/235.8 |
| 4,595,738 | 6/1986 | Hufnagel et al. | 526/348.1 |
| 4,625,372 | 12/1986 | Hufnagel et al. | 26/73 |
| 4,652,409 * | 3/1987 | Leese et al. | 264/22 |
| 4,675,582 | 6/1987 | Hommes et al. | 318/38 |
| 4,716,068 * | 12/1987 | Seifried et al. | 428/141 |
| 4,758,396 * | 7/1988 | Crass et al. | 264/145 |
| 4,825,111 | 4/1989 | Hommes et al. | 310/12 |
| 4,853,602 | 8/1989 | Hommes et al. | 318/38 |
| 4,968,464 * | 11/1990 | Kojoh et al. | 264/41 |
| 5,034,078 * | 7/1991 | Hodgson, Jr. et al. | 156/85 |
| 5,036,262 | 7/1991 | Schonbach | 318/38 |
| 5,051,225 | 9/1991 | Hommes et al. | 264/288.4 |
| 5,064,579 * | 11/1991 | Kendall et al. | 264/448 |
| 5,072,493 | 12/1991 | Hommes et al. | 26/72 |
| 5,527,594 * | 6/1996 | Kinoshita et al. | 428/212 |
| 5,885,501 * | 3/1999 | Gardner et al. | 264/216 |

METHOD OF STRETCHING FILMS ACCORDING TO AN OVERBIAS OR OVERSTRETCH STRETCH PROFILE

TECHNICAL FIELD

The present invention relates generally to methods of biaxially stretching films and such films, and more particularly to methods of stretching films in two directions simultaneously and such films.

BACKGROUND OF THE INVENTION

It has been known in the art to biaxially stretch films. Additionally, several methods and apparatuses have been described for biaxially stretching films simultaneously in two directions. See, e.g., U.S. Pat. Nos. 2,618,012; 3,046,599; 3,502,766; 3,890,421; 4,330,499; 4,525,317; and 4,853,602. The variability in stretch profiles available with some of these methods and apparatus has also been described.

For example, U.S. Pat. No. 3,890,421 illustrates in its FIG. 1 what the text describes as: Curve I representing normal sequential drawing with lateral drawing following longitudinal drawing; Curve II corresponding to reverse sequential drawing with longitudinal drawing following transverse drawing; and diagonal Curve II (sic, Curve III) representing a regularly progressive simultaneous biaxial drawing in both lateral and longitudinal directions. The '421 patent also states that simultaneous drawing can be performed along an indefinite number of curves between curves I and II with the methods and apparatus described therein (column 4, lines 14–31). Without providing detailed descriptions of stretch profiles to achieve the stated objects, the '421 patent states that the object of the method and apparatus described therein is to regulate the resistance, tensile strength, modulus of elasticity, shrinkage, and flatness of biaxially drawn film by controlling drawing and slack tension throughout the drawing process while avoiding the limiting factors from successive biaxial drawing (column 3, lines 34–39).

U.S. Pat. No. 4,853,602 states that with the method and apparatus described therein, sequential drawing may be performed with lateral preceding longitudinal or with longitudinal preceding lateral (column 34, lines 35–55). This patent also states that for simultaneous stretching, any desired drawing of the film can be achieved (column 35, lines 17 et seq.).

Stretch profiles which include relaxing the film in one or more directions after achieving a higher intermediate stretch are also known. For example, U.S. Pat. No. 4,330,499 states that shrinking of the film occurs in the longitudinal direction at up to 10% of the previous produced longitudinal stretching, over the last 5 to 10% of the stretch apparatus length, preferably while the film is further stretched in the transverse direction (see Abstract).

Uniform thickness is important in adhesive tape manufacturing because it is an indication of the uniformity of the film properties and because non-uniform thickness leads to gapping or telescoping of tape rolls.

The majority of commercially available biaxially oriented polypropylene films are produced by the flat film or tenter stretching process. Typical tenter processes serve to biaxially stretch films either predominately simultaneously or predominately sequentially. Currently, simultaneously tenter stretched films comprise a minor part of the film backing market because, although such processes can continuously stretch films in both longitudinal and transverse directions, they have historically proven costly, slow, and inflexible regarding allowable stretching ratios.

SUMMARY OF THE INVENTION

In one aspect, the present invention provides a method of biaxially stretching a polymeric film according to a stretch profile to a final first direction stretch parameter and a final second direction stretch parameter. The method comprising the steps of:

a) imparting a sufficiently high temperature to the film to allow a significant amount of biaxial stretch;

b) biaxial tenter stretching the film to a peak first direction stretch parameter that is at least 1.2 times the final first direction stretch parameter, wherein the final first direction stretch parameter is no larger than the final second direction stretch parameter; and c) subsequent to step b), retracting the film in the first direction to the final first direction stretch parameter.

In one preferred embodiment of the above method, a significant portion of the first direction stretch is performed simultaneously with a portion of the second direction stretch. A significant portion of the retraction may be performed simultaneously with a portion of the second direction stretch.

In another preferred embodiment of the above method, a significant portion of the retraction is performed simultaneously with a portion of the second direction stretch.

In another preferred embodiment of the above method, the peak first direction stretch parameter is at least 1.3 times the final first direction stretch parameter. The peak first direction stretch parameter may at least 1.4 times the final first direction stretch parameter. The peak first direction stretch parameter may at least 1.5 times the final first direction stretch parameter.

In another preferred embodiment of the above method, the first direction is the MD and the second direction is the TD.

In another preferred embodiment of the above method, the final first direction stretch parameter is less than the uniaxial natural stretch parameter.

In another preferred embodiment of the above method, the final first direction stretch parameter is less than the natural stretch parameter for a proportional stretch profile.

In another preferred embodiment of the above method, the final second direction stretch parameter is greater than the uniaxial natural stretch parameter.

In another preferred embodiment of the above method, the final second direction stretch parameter is greater than the natural stretch parameter for a proportional stretch profile.

In another preferred embodiment of the above method, the film comprises a thermoplastic film. Preferably, the film comprises a semi-crystalline film. More preferably, the film comprises polyolefin. In a particularly preferred embodiment, the film comprises polypropylene.

In another preferred embodiment of the above method, step b) further comprises grasping the film with a plurality of clips along the opposing edges of the film and propelling the clips in the machine direction along clip guide means that diverge in the transverse direction.

In another preferred embodiment of the above method, step b) further includes stretching the film to at least 75% of the final first direction stretch parameter before no more than 50% of the final second direction stretch parameter is attained. Alternatively, step b) further includes stretching the film to at least 90% of the final first direction stretch parameter before no more than 50% of the final second direction stretch parameter is attained.

In another preferred embodiment of the above method, step 1)) further includes stretching the film to more than 100% of the final first direction stretch parameter before no more than 50% of the final second direction stretch parameter is attained.

In another preferred embodiment of the above method, step b) further includes stretching the film to the peak first direction stretch parameter before no more than 50% of the final second direction stretch parameter is attained.

In another preferred embodiment of the above method: i) a straight line between the point defining zero stretch parameter and the point defining the final first direction stretch parameter and the final second direction stretch parameter represents a proportional stretch profile and defines a proportional stretch area; and ii) the curve representing the stretch profile between the point defining zero stretch parameter and the point defining the final first direction stretch parameter and the final second direction stretch parameter defines an area at least 1.4 times the proportional stretch area. The ratio may be instead be at least 1.7.

Another aspect of the present provides a method of biaxially stretching a polypropylene film according to a stretch profile to a final first direction stretch parameter and a final second direction stretch parameter, wherein the final first direction stretch parameter is no greater than the final second direction stretch parameter, and wherein the first direction stretch parameter is less than the natural stretch parameter for a proportional stretch profile. The method comprises the steps of: ) imparting a sufficiently high temperature to the film to allow significant amount of biaxial stretch; b) stretching the film to a peak first direction stretch parameter that is at least 1.2 times the final first direction stretch parameter, wherein a significant portion of the peak first direction stretch is performed simultaneously with a portion of the second direction stretch; and c) subsequent to step b), retracting the film in the first direction to the final first direction stretch parameter.

The present invention also provides a film obtained by any of the methods described above. The present invention also provides a tape comprising a backing including a fist major surface and a layer of adhesive on said first major surface, wherein said backing comprises a the film a film obtained by any of the methods described above.

Certain terms are used in the description and the claims that, while for the most part are well known, may require some explanation. "Biaxially stretched," when used herein to describe a film, indicates that the film has been stretched in two different directions, a first direction and a second direction, in the plane of the film. Typically, but not always, the two directions are substantially perpendicular and are in the machine direction ("MD") of the film and the transverse direction ("TD") of the film. Biaxially stretched films may be sequentially stretched, simultaneously stretched, or stretched by some combination of simultaneous and sequential stretching. "Simultaneously biaxially stretched," when used herein to describe a film, indicates that significant portions of the stretching in each of the two directions are performed simultaneously. Unless context requires otherwise, the terms "orient," "draw," and "stretch" are used interchangeably throughout, as are the terms "oriented," "drawn," and "stretched," and the terms "orienting," "drawing," and "stretching."

The term "stretch ratio," as used herein to describe a method of stretching or a stretched film, indicates the ratio of a linear dimension of a given portion of a stretched film to the linear dimension of the same portion prior to stretching. For example, in a stretched film having an MD stretch ratio ("MDR") of 5:1, a given portion of unstretched film having a 1 cm linear measurement in the machine direction would have 5 cm measurement in the machine direction after stretch. In a stretched film having a TD stretch ratio ("TDR") of 5:1, a given portion of unstretched film having a 1 cm linear measurement in the transverse direction would have 5 cm measurement in the transverse direction after stretch. "Area stretch ratio," as used herein, indicates the ratio of the area of a given portion of a stretched film to the area of the same portion prior to stretching. For example, in a biaxially stretched film having an overall area stretch ratio of 50:1, a given 1 $cm^2$ portion of unstretched film would have an area of 50 $cm^2$ after stretch.

The mechanical stretch ratio, also know as nominal stretch ratio, is determined by the unstretched and stretched dimensions of the overall film, and can typically be measured at the film grippers at the edges of the film used to stretch the film in the particular apparatus being used. Global stretch ratio, refers to the overall draw ratio of the film after the portions that lie near the grippers, and thus are affected during stretching by the presence of the grippers, have been removed from consideration. The global stretch ratio can be equivalent to the mechanical stretch ratio when the input unstretched film has a constant thickness across its full width and when the effects of proximity to the grippers upon stretching are small. More typically, however, the thickness of the input unstretched film is adjusted so as to be thicker or thinner near the grippers than at the center of the film. When this is the case, the global stretch ratio will differ from the mechanical or nominal stretch ratio. These global or mechanical ratios are both to be distinguished from a local stretch ratio. The local stretch ratio is determined by measuring a particular portion of the film (for example a 1 cm portion) before and after stretch. When stretch is not uniform over substantially the entire edge-trimmed film, then the local ratio can be different from the global ratio. When stretch is substantially uniform over substantially the entire film (excluding the area immediately near the edges and surrounding the grippers along the edges), then the local ratio will be substantially equal to the global ratio. Unless the context requires otherwise, the terms first direction stretch ratio, second direction stretch ratio, MD stretch ratio, TD stretch ratio, and area stretch ratio are used herein to describe the global stretch ratio.

The term "stretch parameter" is used to indicate the value of the stretch ratio minus 1. For example "first direction stretch parameter" and "second direction stretch parameter" are used herein to indicate the value of first direction stretch ratio minus 1, and second direction stretch ratio minus 1, respectively. Likewise, the terms "MD stretch parameter" and "TD stretch parameter" are used herein to indicate the value of MD stretch ratio minus 1, and TD stretch ratio minus 1, respectively. For example, a film that has not been stretched in the machine direction would have an MD stretch ratio of 1 (i.e., dimension after stretch is equal to dimension before stretch). Such a film would have an MD stretch parameter of 1 minus 1, or zero (i.e., the film has not been stretched). Likewise, a film having an MD stretch ratio of 7 would have an MD stretch parameter of 6.

In reference to simultaneous biaxial stretching, the term "proportional stretch profile" is a stretch profile in which the ratio of the first direction stretch parameter to the second direction stretch parameter is kept substantially constant throughout the stretch process. A particular example of this would be the case where the ratio of the MD stretch parameter to the TD stretch parameter is kept substantially constant throughout the stretch process. As illustrated in FIG. 1, a plot of MD stretch parameter (y-axis) vs. TD stretch parameter (x-axis) for a proportional stretch profile provides a straight line 10 between the point 12 representing zero MD stretch parameter (or an MD stretch ratio of 1) and zero TD stretch parameter (or a TD stretch ratio of 1) to the point 14 representing the final MD stretch parameter and the final TD stretch parameter. For a proportional stretch profile, this line 10 is straight whether the final MD and TD stretch parameters are equal (a "balanced" stretch) or unequal. Also identified on FIG. 1 is the area A under the curve 10 for the proportional stretch profile.

The term "MD overbias" refers to a stretch profile in which the MD stretch ratio during a significant portion of the stretching process is greater than it would be for the proportional stretch profile having the same final MD and TD stretch ratios. One representative MD overbias curve is represented as 16 on FIG. 1. Another way to identify an overbias stretch profile is that the area B under the curve 16 is greater than area A for a proportional stretch profile ending at the same final MD and TD stretch parameter values. An MD overbias profile does not necessarily exclude having some portion of the profile under the proportional stretch profile line 10.

When many films are stretched uniaxially or biaxially at a temperature below the melting point of the polymer, particularly at a temperature below the line drawing temperature of the film, the film stretches non-uniformly, and a clear boundary is formed between stretched and unstretched parts. This phenomenon is referred to as necking or line drawing. Substantially the entire film is stretched uniformly when the film is stretched to a sufficiently high degree. The stretch ratio at which this occurs is referred to as the "natural stretch ratio" or "natural draw ratio." The necking phenomenon and the effect of natural stretch ratio is discussed, for example, in U.S. Pat. Nos. 3,903,234; 3,995,007; and 4,335,069. Most discussions of natural draw ratio for biaxial orientation processes are with respect to sequential stretching processes. In such a process, for either a natural draw ratio in the first stretching direction or a natural draw ratio in the second stretching direction, the natural draw ratio in question is substantially analogous to that for a uniaxial stretch. When stretching is done at temperatures near the melting point, or when simultaneous equal biaxial stretching (also referred to a square stretching) is performed, the necking phenomena can be less pronounced, resulting in stretched areas having different local stretch ratios, rather than strictly stretched and unstretched parts. In such a situation, and in any simultaneous biaxial stretching process, the "natural stretch ratio" for a given direction is defined as that global stretch ratio at which the relative standard deviation of the local stretch ratios measured at a plurality of locations upon the film is below about 15%. Stretching above the natural stretch ratio is widely understood to provide significantly more uniform properties or characteristics such as thickness, tensile strength, and modulus of elasticity. For any given film and stretch conditions, the natural stretch ratio is determined by factors such as the polymer composition, morphology due to cast web quenching conditions and the like, and temperature and rate of stretching. Furthermore, for biaxially stretched films, the natural stretch ratio in one direction will be affected by the stretch conditions, including final stretch ratio, in the other direction. Thus, there may be said to be a natural stretch ratio in one direction given a fixed stretch ratio in the other, or, alternatively, there may be said to be a pair of stretch ratios (one in MD and one in TD) which result in the level of local stretch uniformity by which the natural stretch ratio is defined above.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 2:
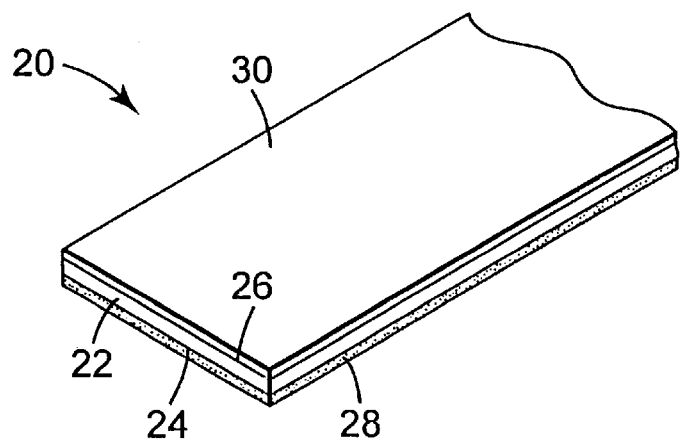
FIG. 2 is an isometric view of a preferred tape according to the present invention.

Referring to FIG. 2, there is shown a length of tape 20 according to one preferred embodiment of the present invention. Tape 20 comprises a film backing 22 which includes first major surface 24 and second major surface 26. Preferably, backing 22 has a thickness in the range of about 0.020 to about 0.064 mm. Backing is 22 of tape 20 is coated on first major surface 24 with a layer of adhesive 28. Adhesive 28 may be any suitable adhesive as is known in the art. Backing 22 may have an optional release or low adhesion backsize layer 30 coated on the second major surface 26 as is known in the art. In one preferred embodiment, backing 22 comprises a biaxially stretched monolayer film as described herein. Backing 22 alternatively may comprise a bilayer, trilayer or other multilayer backing, one of which layers comprises a biaxially stretched film as described herein.

Preferably, the film backing 22 comprises a polymeric film. More preferably, the film backing 22 comprises a thermoplastic polymer. For a film comprising more than one layer, the description of suitable materials which follows need apply only to one of said layers. Suitable polymeric film materials for use in the current invention include all thermoplastics capable of being formed into biaxially oriented films. Suitable thermoplastic polymer film materials include, but are not limited to, polyesters, polycarbonates, polyarylates, polyamides, polyimides, polyamide-imides, polyether-amides, polyetherimides, polyaryl ethers, polyarylether ketones, aliphatic polyketones, polyphenylene sulfide, polysulfones, polystyrenes and their derivatives, polyacrylates, polymethacrylates, cellulose derivatives, polyethylenes, polyolefins, copolymers having a predominant olefin monomer, fluorinated polymers and copolymers, chlorinated polymers, polyacrylonitrile, polyvinylacetate, polyvinylalcohol, polyethers, ionomeric resins, elastomers, silicone resins, epoxy resins, and polyurethanes. Miscible or immiscible polymer blends comprising any of the above-named polymers, and copolymers comprising any of the constituent monomers of any of the above-named polymers, are also suitable, provided a biaxially oriented film may be produced from such a blend or copolymer.

Still more preferred are semi-crystalline, thermoplastic, polymeric films. Semi-crystalline themoplastics include, but are not limited to, polyesters, polyamides, thermoplastic polyimides, polyarylether ketones, aliphatic polyketones, polyphenylene sulfide, isotactic or syndiotactic polystyene and their derivatives, polyacrylates, polymethacrylates, cellulose derivatives, polyethylene, polyolefins, fluorinated polymers and copolymers, polyvinylidene chloride, polyacrylonitrile, polyvinylacetate, and polyethers. Still more preferred are semi-crystalline thermoplastics which can be stretched to form a biaxially oriented film from the semi-crystalline state. These include, but are not limited to, certain polyesters and polyamides, certain fluorinated polymers, syndiotactic polystyrene, polyethylenes, and polyolefins. Still more preferred are polyethylenes and polypropylenes. Predominantly isotactic polypropylene is most preferred.

For the purposes of the present invention, the term "polypropylene" is meant to include copolymers comprising at least about 90% propylene monomer units, by weight. "Polypropylene" is also meant to include polymer mixtures comprising at least about 75% polypropylene, by weight. Polypropylene for use in the present invention is preferably predominantly isotactic. Isotactic polypropylene has a chain isotacticity index of at least about 80%, an n-heptane soluble content of less than about 15% by weight, and a density between about 0.86 and 0.92 grams/cm$^3$ measured according to ASTM D1505-96 ("Density of Plastics by the Density-Gradient Technique"). Typical polypropylenes for use in the present invention have a melt flow index between about 0.1 and 15 grams/ten minutes according to ASTM D 1238-95 ("Flow Rates of Thermoplastics by Extrusion Plastometer") at a temperature of 230° C. and force of 21.6 N, a weight-average molecular weight between about 100,000 and 400,000, and a polydispersity index between about 2 and 15. Typical polypropylenes for use in the present invention have and a melting point as determined using differential scanning calorimetry of greater than about 130° C., preferably greater than about 140° C., and most preferably greater than about 150° C. Further, the polypropylenes useful in this invention may be copolymers, terpolymers, quaterpolymers, etc., having ethylene monomer units and/or alpha-olefin monomer units having between 4–8 carbon atoms, said comonomer(s) content being less than 10 % by weight. Other suitable comonomers include, but are not limited to, 1-decene, 1-dodecene, vinylcyclohexane, styrene, alkylbenzene, cyclopentene, norbornene, and 5-methylnorbornene. One suitable polypropylene resin is an isotactic polypropylene homopolymer resin having a melt flow index of 2.5 g/10 minutes, commercially available under the product designation 3374 from FINA Oil and Chemical Co., Dallas, Tex. The polypropylene may be intentionally partially degraded during processing by addition of organic peroxides such as dialkyl peroxides having alkyl groups having up to six carbon atoms, 2,5-dimethyl-2,5-di(tert-butylperoxy)hexane, and di-tert-butyl peroxide. A degradation factor between about 2 and 15 is suitable. Recycled or reprocessed polypropylene in the form, for example, of scrap film or edge trimmings, may also be incorporated into the polypropylene in amounts less than about 60% by weight.

As already mentioned, mixtures having at least about 75% isotactic polypropylene and at most about 25% of another polymer or polymers may also be advantageously used in the process of the present invention. Suitable additional polymers in such mixtures include, but are not limited to, propylene copolymers (, polyethylenes, polyolefins comprising monomers having from four to eight carbon atoms, and other polypropylene resins.

Polypropylene for use in the present invention may optionally include 1–40% by weight of a resin, of synthetic or natural origin, having a molecular weight between about 300 and 8000, and having a softening point between about 60° C. and 180° C. Typically, such a resin is chosen from one of four main classes: petroleum resins, styrene resins, cyclopentadiene resins, and terpene resins. Optionally, resins from any of thee classes may be partially or fully hydrogenated. Petroleum resins typically have, as monomeric constituents, styrene, methylstyrene, vinyltoluene, indene, methylindene, butadiene, isoprene, piperylene, and/or pentylene. Styrene resins typically have, as monomeric constituents, styrene, methylstyrene, vinyltoluene, and/or butadiene. Cyclopentadiene resins typically have, as monomeric constituents, cyclopentadiene and optionally other monomers. Terpene resins typically have, as monomeric constitutents, pinene, alpha-pinene, dipentene, limonene. myrcene, and camphene.

Polypropylene for use in the present invention may optionally include additives and other components as is known in the art. For example, the films of the present invention may contain fillers, pigments and other colorants, antiblocking agents, lubricants, plasticizers, processing aids, antistatic agents, nucleating agents, antioxidants and heat stabilizing agents, ultraviolet-light stabilizing agents, and other property modifiers. Fillers and other additives are preferably added in an effective amount selected so as not to adversely affect the properties attained by the preferred embodiments described herein. Typically such materials are added to a polymer before it is made into an oriented film (e.g., in the polymer melt before extrusion into a film). Organic fillers may include organic dyes and resins, as well as organic fibers such as nylon and polyimide fibers, and inclusions of other, optionally crosslinked, polymers such as polyethylene, polyesters, polycarbonates, polystyrenes, polyamides, halogenated polymers, polymethyl methacrylate, and cycloolefin polymers. Inorganic fillers may include pigments, fumed silica and other forms of silicon dioxide, silicates such as aluminum silicate or magnesium silicate, kaolin, talc, sodium aluminum silicate, potassium aluminum silicate, calcium carbonate, magnesium carbonate, diatomaceous earth, gypsum, aluminum sulfate, barium sulfate, calcium phosphate, aluminum oxide, titanium dioxide, magnesium oxide, iron oxides, carbon fibers, carbon black, graphite, glass beads, glass bubbles, mineral fibers, clay particles, metal particles and the like. In some applications it may be advantageous for voids to form around the filler particles during the biaxial orientation process of the present invention. Many of the organic and inorganic fillers may also be used effectively as antiblocking agents. Alternatively, or in addition, lubricants such as polydimethyl siloxane oils, metal soaps, waxes, higher aliphatic esters, and higher aliphatic acid amides (such as erucamide, oleamide, stearamide, and behenamide) may be employed.

Antistatic agents may also be employed, including aliphatic tertiary amines, glycerol monostearates, alkali metal alkanesulfonates, ethoxylated or propoxylated polydiorganosiloxanes, polyethylene glycol esters, polyethylene glycol ethers, fatty acid esters, ethanol amides, mono- and diglycerides, and ethoxylated fatty amines. Organic or inorganic nucleating agents may also be incorporated, such as dibenzylsorbitol or its derivatives, quinacridone and its derivatives, metal salts of benzoic acid such as sodium benzoate, sodium bis(4-tert-butyl-phenyl)phosphate, silica, talc, and bentonite. Antioxidants and heat stabilizers, including phenolic types (such as pentaerythrityl tetrakis [3-(3,5-di-tert-butyl-4-hydroxyphenyl)propionate] and 1,3,5-trimethyl-2,4,6-tris(3,5-di-tert-butyl-4-hydroxybenzyl)benzene), and alkali and alkaline earth metal stearates and carbonates may also be advantageously used. Other additives such as flame retardants, ultraviolet-light stabilizers, compatibilizers, antimicrobial agents (e.g., zinc oxide), electrical conductors, and thermal conductors (e.g., aluminum oxide, boron nitride, aluminum nitride, and nickel particles) may also be blended into the polymer used to form the film.

The polymer can be cast into sheet form as is known in the art, to prepare a sheet suitable for stretching to arrive at the preferred film described herein. When making polypropylene films, a suitable method for casting a sheet is to feed the resin into the feed hopper of a single screw, twin screw, cascade, or other extruder system having an extruder barrel temperature adjusted to produce a stable homogeneous melt. The polypropylene melt can be extruded through a sheet die onto a rotating cooled metal casting wheel. Optionally, the casting wheel can be partially immersed in a fluid-filled cooling bath, or, also optionally, the cast sheet can be passed through a fluid-filled cooling bath after removal from the casting wheel.

The sheet is then biaxially stretched according to the preferred profiles described herein to provide backing film 22. Of all stretching methods, the methods most preferred for commercial manufacture of films for tape backings include biaxial tretching by a flat film tenter apparatus. Such a stretch method is referred to herein as biaxial tenter stretching. This process is distinct from conventional sequential biaxial stretch apparatus in which the film is stretched in the MD by being propelled over rollers of increasing speed. Biaxial tenter stretching is preferred because it avoids contacting the full surface of the film with a roller during stretch. Biaxial tenter stretching is performed on a tenter apparatus that grasps the film (employing such means as a plurality of clips) along the opposing edges of the film and propels the grasping means at varying speeds along divergent rails. Throughout this document, the words grippers and clips are meant to be inclusive of other film-edge grasping means. By increasing clip speed in the MD, stretch in the MD occurs. By using such means as diverging rails, TD stretch occurs. Such stretching can be accomplished, for example, by the methods and apparatus disclosed in U.S. Pat. Nos. 4,330,499 and 4,595,738, and more preferably by the methods and tenter apparatus disclosed in U.S. Pat. Nos. 4,675,582; 4,825,111; 4,853,602; 5,036,262; 5,051,225; and 5,072,493. Such a biaxial tenter apparatus is capable of sequential and simultaneous biaxial stretch processes, and the present invention includes either process. When the preferred stretch profiles described and claimed herein are referred to as including a substantial portion that is simultaneous, this means more than an incidental amount, preferably at least 10% of the final stretch in each direction being performed simultaneously, more preferably at least 25%, and still more preferable at least 40%. Although biaxially stretched films can be made by tubular blown film stretching processes, it is preferable that the films of this invention, when used as tape backings, be made by the preferred flat film tenter stretching processes just described to minimize thickness variations and avoid processing difficulties typically associated with tubular blown film processes.

Figure 1:
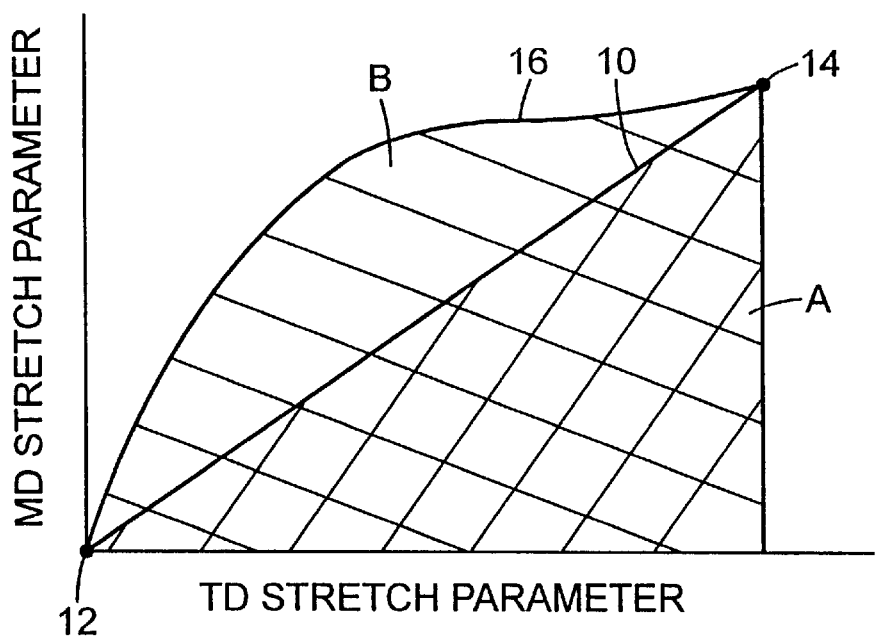
FIG. 1 is a plot of a proportional stretch profile and a representative MD overbias stretch profile.
Figure 3:
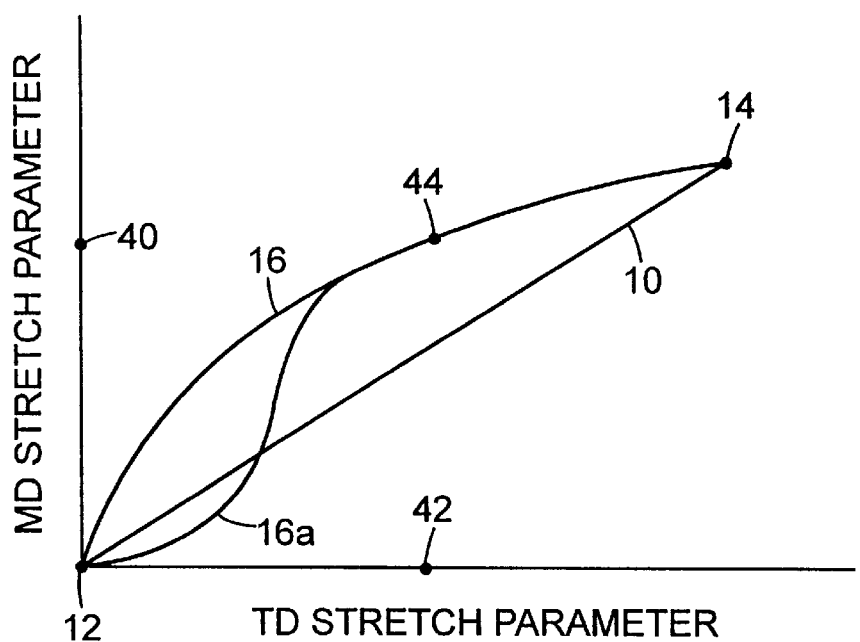
FIG. 3 is a plot of a preferred overbias stretch profile according to the present invention.

One class of preferred stretch profiles according to the present invention is the class of MD overbias stretch profiles. In an MD overbias stretch profile, the MD stretch parameter attains a higher value over a significant portion of the stretching process than it would attain in the case of the proportional stretch profile having the same final MD and TD stretch ratios. One illustrative MD overbias curve is represented as 16 on FIG. 1. One preferred MD overbias stretch profile is one in which at least 75% of the final MD stretch parameter is attained before no more than 50% of the final TD stretch parameter is attained. A more preferred MD overbias tretch profile is one in which at least 90% of the final MD stretch parameter is attained before no more than 50% of the final TD stretch parameter is attained. An example of such a profile 16 is illustrated in FIG. 3. For a film having a final MD stretch ratio of 5.4 and a final TD stretch ratio of 8.5 (commonly referred to as a 5.4×8.5 film), the final MD stretch parameter equals 4.4 and the final TE) stretch parameter equals 7.5 and is identified as point 14 on FIG. 3. For the preferred MD overbias profile of FIG. 3, at least 90% of the final MD stretch parameter is (0.9×5.4)= 4.86, illustrated as point 40 on the y-axis. Illustrated as point 42 on the x-axis is 50% of the final TD stretch parameter is (0.5−7.5)=3.75. Therefore, for the illustrated preferred profile, an MD stretch parameter of 4.86 attained before a TD stretch parameter of no more than 3.75 is attained as illustrated at point 44 on the profile. The illustrated MD overbias profile 16 does not include any portion that is below the proportional stretch profile line 10. However, it is within the scope of the present invention to include a portion of the profile under the proportional stretch profile line in an MD overbias profile that attains preferably at least 75%, more preferably at least 90% of the final MD stretch parameter before no more than 50% of the final TD stretch parameter is attained. This is illustrated as profile 16a in FIG. 3.

Figure 4:
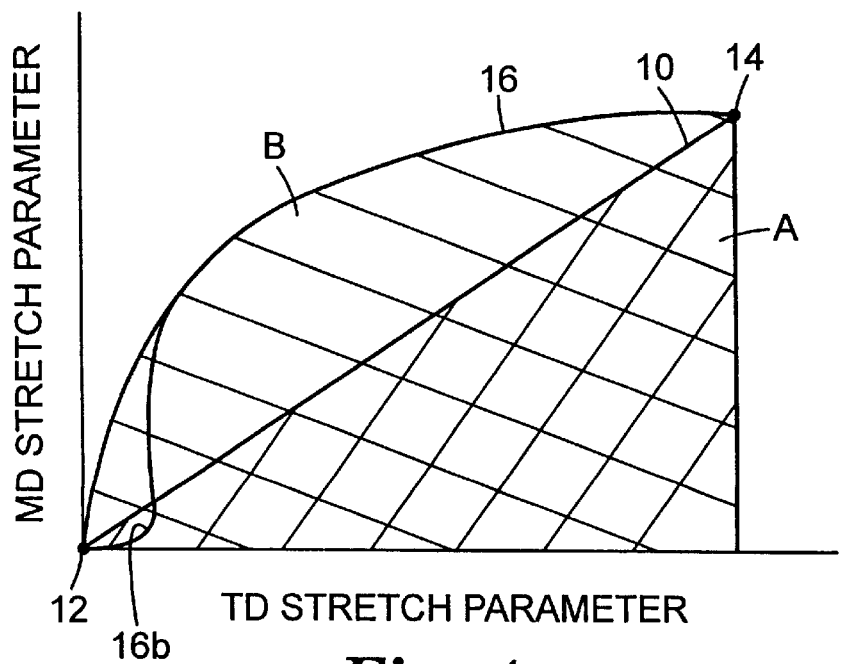
FIG. 4 is a plot of an alternative preferred overbias stretch profile according to the present invention.

Another way to identify an MD overbias stretch profile is that the area B under the curve 16 is greater than area A for a proportional stretch profile ending at the same final MD and TD stretch parameters as illustrated in FIG. 4. One preferred embodiment of an MD overbias stretch profile 16 is one in which the area B under the stretch profile curve 16 is at least 1.4 times the area A under the line 10 defining a proportional stretch profile. In another preferred profile, the area B is at least 1.7 times area A. In still another preferred profile, area B is at least 2.0 times area A. In yet another preferred profile, area B is at least 2.5 times area A. And in another preferred profile, area B is approximately 2.5 times area A. In the profile illustrated in FIG. 4, the MD overbias stretch profile 16 does not include a portion under the proportional stretch profile line 10. However, it is within the scope of the invention to include a portion of the profile under the proportional stretch profile line in an MD overbias profile that has area B larger than proportional area A by the specified amount as illustrated by profile 16b in FIG. 4.

Figure 5:
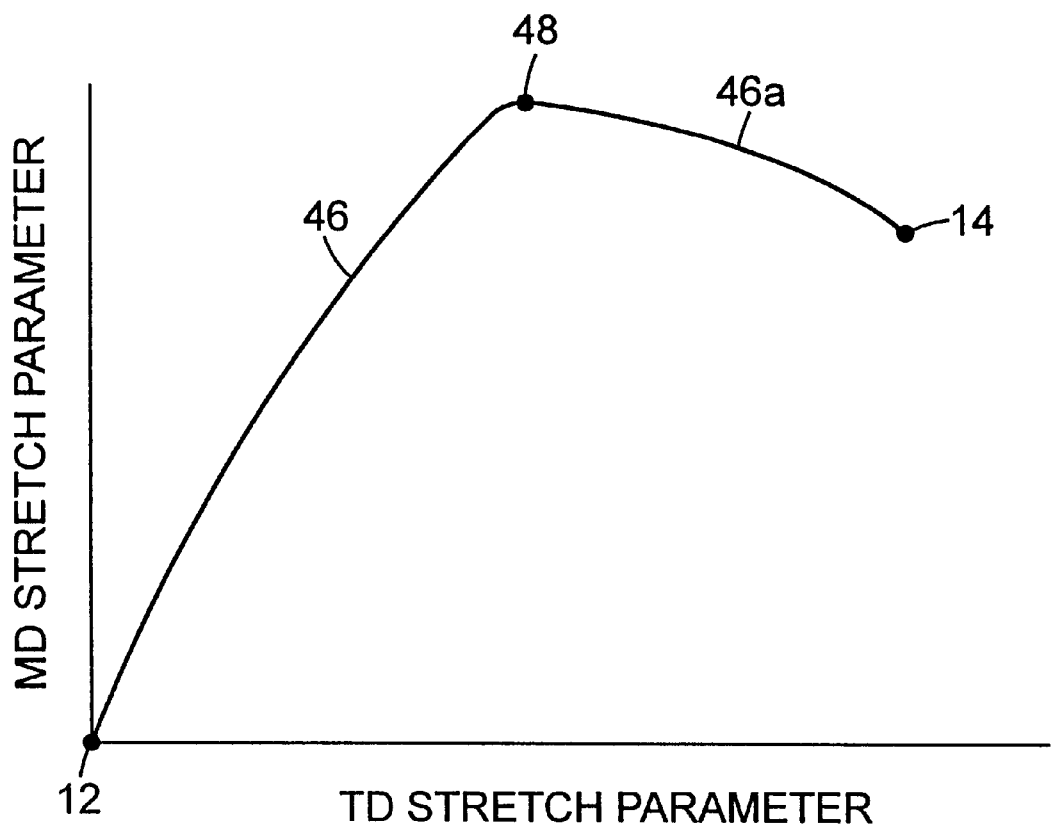
FIG. 5 is a plot of a preferred overstretch profile according to the present invention.

Another preferred stretch profile of the present invention includes an MD overstretch in the profile, followed by a retraction in the machine direction. As illustrated in FIG. 5, such a profile 46 includes reaching a peak MD stretch parameter at point 48 followed by a retraction in the machine direction to the final MD stretch parameter at point 14. While it is possible to perform this retraction in the absence of TD direction stretch, it is preferred that for a significant amount of to overstretch, a significant portion of the retraction occur simultaneous with a portion of the TD stretch as illustrated by segment 46a of the profile 46 of FIG. 5. In one preferred embodiment, the peak MD stretch parameter 48 achieved during overstretch is at least 1.2 times the value of the final MD stretch parameter 14. In another preferred embodiment, the peak MD stretch parameter is at least 1.3 times the final MD stretch parameter. In still another preferred embodiment, the peak MD stretch parameter is at least 1.4 times the final MD stretch parameter. In yet another preferred embodiment, the peak MD stretch parameter is at least 1.5 times the final MD stretch parameter. And in another preferred embodiment, the peak MD stretch parameter is approximately 1.5 times the final MD stretch parameter.

The preferred MD overstretch profiles described herein may also be combined with the preferred MD overbias stretch profiles described herein. In other words, such a stretch profile would achieve the desired amount of MD stretch parameter before no more than the specified amount of TD stretch parameter is attained, while also achieving the preferred peak MD stretch parameter and subsequent machine direction retraction described above. Similarly, for any of the MD overbias stretch profiles that include area B sufficiently larger than area A, these profiles may also include the attainment of preferred peak MD stretch parameter and subsequent machine direction retraction described above.

Many of the preferred embodiments are described herein with respect to the MD and TD of the film, as are the examples. However, it is understood that any of the preferred stretch profiles herein and examples reported herein can be described with reference to a first direction and a second direction substantially perpendicular to the first direction. This is so with respect to overbias stretch profiles, overstretch profiles, and any of the parameters described with respect to the profiles such as final stretch ratio, stretch parameter, and natural stretch ratio. Thus, the preferred overbias and/or overstretch profiles of the present invention may be described with reference to a first direction in which the final stretch ratio is no greater than the final stretch ratio in a second direction. The first direction may be either the MD or the TD. That is, the profile may be first direction overbias or first direction overstretch, and these encompass profiles which may be MD overbias, TD overbias, MD overstretch, and TD overstretch. Either the first or second direction may correspond to the MD with the other corresponding to the TD. It is also understood that the improved properties of a film made with, for example, a TD overbias stretching profile, would pertain to the opposite direction from those of a film made with a MD overbias stretching profile.

In any of the overbias or overstretch profiles described herein, it is sometimes preferred that the final stretch ratio in the first direction be less than the natural stretch ratio measured on the same film in a uniaxial stretching mode. For such a case, the overbias or overstretch is in the same direction as the direction for which the final stretch ratio is less than the uniaxial natural stretch ratio. In one particularly preferred overbias profile, the profile is MD overbias, and the final MD stretch ratio is less than the uniaxial natural stretch ratio. In another preferred profile, it is preferred that for the direction that is not overbias, the final stretch ratio is greater than the uniaxial natural draw ratio. In another preferred profile, it is preferred that the final draw ratio in the first direction, having overbias, be less than the uniaxial natural draw ratio and that the final draw ratio in the second direction be greater than the uniaxial natural draw ratio. An example of such a preferred profile is one that is MD overbiased, the final MD stretch ratio is less than the uniaxial natural stretch ratio, and the final TD stretch ratio is greater than the uniaxial natural stretch ratio. As described above, when the final stretch ratio in the first direction is less than the uniaxial natural stretch ratio, it is expected that the resulting film would have in that direction significantly non-uniform properties such as thickness and uniformity of stretch. Sulprisingly, by using the overbias and overstretch stretch profiles described herein, uniformity of properties may be attained in a given direction despite stretching the film to a final stretch ratio less than the uniaxial natural stretch ratio.

Another way to describe this unexpected benefit is to compare films that have been drawn along different stretch profiles to the same final stretch ratio or parameter. When a proportional stretch profile is used, uniform film properties will not be obtained if the final draw ratio in the first direction is below the natural draw ratio for that direction. When a film is stretched to the same final stretch parameter or ratio along a stretch profile have sufficient overbias, the film will exhibit uniform properties. It can be said that the overbias stretch profile reduces the value of the natural draw ratio in the direction in which the overbias is present. This allows stretching the film along an overbias stretch profile to a lower final draw ratio in that direction than would have been possible for a proportional stretch profile while nonetheless achieving a stretched film having acceptable uniform properties and characteristics.

Sometimes it is preferred to have a film with a high elongation to break and high toughness in a certain direction. These properties can be achieved with a low final draw ratio in that direction. Prior to the present invention, it was difficult to obtain films with uniform thickness and properties by stretching to a low final draw ratio. A low final draw ratio is conveniently obtained with the overbias and/or overstretch profiles described herein. These profiles also provide films with uniform properties and thickness.

Biaxial stretching of films is sensitive to many process conditions, including but not limited to the composition of the resin, film casting and quenching parameters, the time-temperature history while preheating the film prior to stretching, the stretching temperature employed, and the rates of stretching. With the benefits of the teachings herein, one of skill in the art may adjust any or all of the parameters and thereby obtain improvements which differ in magnitude, or may thereby be able to adjust the precise levels of stretch profile overbias necessary to realize said improvements.

The films useful in this invention, when used as a backing 22 for a tape 20. preferably have a final thickness between about 0.020 to 0.064 mm. Thicker and thinner films may be used, with the understanding that the film should be thick enough to avoid excessive flimsiness and difficulty in handling, while not being so thick so as to be undesirably rigid or stiff and difficult to handle or use. Variability in film thickness, as measured by the standard deviation relative to the average, is preferably less than 10% down the web and across the interior width of the film excluding its edge areas. This interior width varies depending on the relative portion of the film edges to the entire width of the film. Generally, film edge is not stretched biaxially, but rather exhibits stretched characteristics that tend toward the uniaxial even in a biaxial stretching operation. Therefore the film edges are thicker. In some cases, a cast web of intentionally non-uniform thickness is stretched. If a thicker edge is used in the cast web, then the film edge width in the stretched film will be defined by the original cast web thickness profile, in addition to the localizing effect of the gripper.

For the preferred embodiment of film backing 22 comprising isotactic polypropylene, the film backing 22 preferably has a tensile elongation to break of at least 110% and a tensile volumetric energy to break of at least 18,000 in-lb/in$^3$.

Backing 22 may optionally include additives and other components as is known in the art and described above, preferably in an amount selected so as not to adversely affect the tensile properties attained by the preferred embodiments described herein.

In the case of films intended for use as adhesive tape backings, stock rolls are typically slit from a wider input film roll from the film maker. The stock rolls are typically coated with adhesive on one surface and a release coating or low adhesion backsize (LAB) on the other, slit to narrow widths and wound into roll form.

The adhesive 28 coated on the first major surface 24 of tape backing 22 may be any suitable adhesive as is known in the art. Preferred adhesives are those activatable by pressure, heat or combinations thereof. Suitable adhesives include those based on acrylate, rubber resin, epoxies, urethanes or combinations thereof. The adhesive 28 may be applied by solution, water-based or hot-melt coating methods. The adhesive can include hot melt-coated formulations, transfer-coated formulations, solvent-coated formulations, and latex formulations, as well as laminating, thermally-activated, and water-activated adhesives and bonding agents. Useful adhesives according to the present invention include all pressure sensitive adhesives. Pressure sensitive adhesives are well known to possess properties including: aggressive and permanent tack, adherence with no more than finger pressure, and sufficient ability to hold onto an adherend. Examples of adhesives useful in the invention include those based on general compositions of polyacrylate; polyvinyl ether; diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above. Additionally, the adhesives can contain additives such as tackifiers, plasticizers, fillers, antioxidants, stabilizers, pigments, diffusing materials, curatives, fibers, filaments, and solvents. Also, the adhesive optionally can be cured by any known method.

A general description of useful pressure sensitive adhesives may be found in Encyclopedia of Polymer Science and Engineering, Vol. 13, Wiley-lnterscience Publishers (New York, 1988). Additional description of useful pressure sensitive adhesives may be found in Encyclopedia of Polymer Science and Technology, Vol. 1, Interscience Publishers (New York, 1964).

The film backing 22 of the tape 20 may be optionally treated by exposure to flame or corona discharge or other surface treatments including chemical priming to improve adhesion of subsequent coating layers. In addition, the second surface 26 of the film backing 22 may be coated with optional low adhesion backsize materials 30 to restrict adhesion between the opposite surface adhesive layer 28 and the film 22, thereby allowing for production of adhesive tape rolls capable of easy unwinding, as is well known in the adhesive coated tape-making art.

The operation of the present invention will be further described with regard to the following detailed examples. These examples are offered to further illustrate the various specific and preferred embodiments and techniques. It should be understood, however, that many variations and modifications may be made while remaining within the scope of the present invention.

EXAMPLES

For all Examples 1–13, the unstretched cast film was obtained as follows. A film-grade isotactic polypropylene copolymer resin having a nominal melt flow index of 2.5g/10 minutes and having an ethylene comonomer content of 0.3%, obtained from Exxon Chemical Co. (Houston, Tex), and having the commercial designation Escorene 4792, was fed to a cascade extrusion system, comprising a 17.5 cm single screw extruder and a 22.5 cm single screw extruder, manufactured by Barmag AG (Remscheid, Germany), having an extruder barrel temperature of about 250° C., which was adjusted to produce a stable homogeneous melt. The polypropylene melt was extruded through a 91.4 cm single manifold sheet die onto a rotating cooled steel casting wheel maintained at about 38° C. The casting wheel was mounted in such a way as to be immersed to a high level in a water bath, which was maintained at 20° C. The cast film thus traveled through the water bath while still in contact with the casting wheel. The unstretched cast film had a thickness of about 0.13 cm.

Specimens of the cast film were then stretched simultaneously in their two orthogonal in-plane directions to an MD mechanical stretch ratio ("MDR") of 5.4 and a TD mechanical stretch ratio ("TDR") of 8.5. Independent measurements in uniaxial mode on the same unstretched cast film at similar temperatures and stretch rates indicated that the uniaxial natural stretch ratio for this material was between about 6 and about 7, thus the MDR is smaller than the uniaxial natural stretch ratio and the TDR is larger than the uniaxial natural stretch ratio in all the Examples. Stretching was performed on a hydraulically-driven laboratory biaxial film stretching device having a programmable temperature-controlled oven. The positions of two orthogonal stretching subsystems within the oven, and hence the stretch ratios of the film specimen, were also programmable as a function of time. The MD and TD were defined for each specimen in terms of the original MD and TD of the film extrusion-casting process. It should be clearly understood that the laboratory biaxial film stretching device, itself, has no inherent "machine" and "transverse" directions, since it is a batchwise, rather than a continuous processing, device. In all Examples, stretching began and ended simultaneously for each of the two orthogonal directions. Other parts of the procedure common to all Examples were as follows.

The cast film sheet of about 0.13 cm thickness was cut into square specimens. The specimens were cut to a size which resulted in the gripped specimens having a stretchable dimension of about 4.6 cm in each of the two planar directions, after edgewise gripping by the jaws of a film stretching frame within the oven chamber of the device. Each specimen was pre-heated for 45 seconds at 130° C., followed by an additional 45 seconds at 160° C. Each specimen was then simultaneously biaxially stretched using pre-programmed stretching profiles which were computed to simulate the workings of a film line capable of simultaneous biaxially orientation within its tenter oven. After the completion of the stretching, specimens were rapidly cooled and then quickly removed from the film stretching device. At least three specimens were stretched at the conditions of each Example, and the resultant replicate specimen films were examined visually for consistency of stretching behavior. Occasional specimens which behaved anomalously (tearing at or near a gripper, for example) were discarded. One specimen from the three at a given set of conditions was used for stretch uniformity measurements, while the other two were used for tensile testing.

In each Example, the two component (MD and TD) time-dependent stretching profiles were combined into a plot of MD stretch parameter vs. TI) stretch parameter by pairing the points from the two component time-dependent stretching profiles at identical times. This plot is hereafter referred to as the Stretch Profile. From such a plot, the following parameters may be calculated, either graphically or numerically:

"% MD stretch parameter at 25% TD stretch parameter."
This represents what percent of the final MD stretch parameter was attained when 25% of the final TD stretch parameter was attained.

"% MD stretch parameter at 50% TD stretch parameter."
This represents what percent of the final MD stretch parameter was attained when 50% of the TD stretch parameter was attained.

"Stretch Profile Area Ratio." This parameter represents the ratio of:
  the area bounded by the Stretch Profile, the axis at which the MD Stretch Parameter equals zero, and the vertical line drawn at the final TD Stretch Parameter; to
  the area bounded by a straight line connecting the starting point to the final point (i.e., the proportional stretch profile), the axis at which the MD Stretch Parameter equals zero, and the vertical line drawn at the final TD Stretch Parameter.
This is represented by the ratio of area B to area A in FIG. 1.

Test Methods

Stretch Uniformity:

Prior to stretching, grids having reference lines along the MD and TD at one centimeter spacings were drawn on the cut-square cast film specimens in such a way that two of the reference lines were positioned to cross at the exact film center. After stretching, the separation of these reference markings was measured to determine the local stretch ratios. To exclude the edge effects due to scalloping of edges between adjacent pairs of film grippers, measurements were made using only the central three reference lines running in each of the machine and transverse directions. Further, reference line displacements were measured only along the perpendicular reference lines. Thus, reference line displacements in the MD were measured between the central reference line running along the TD and the adjacent reference line to either side, and were measured along only the central reference line running along the MD and the adjacent reference lines to either side, for a total of six measurements. Measurements of displacements in the TD were performed analogously.

The local stretch ratios of films, measured in this way, can vary significantly within one specimen due to necking or line-drawing in one or both of the stretch directions. For the case of simultaneous biaxial stretching, line drawing usually manifests itself as a band or bands on the film, arranged substantially perpendicular to a stretch direction for which the stretch ratio is less than the natural stretch ratio in that direction, wherein such bands are substantially less highly stretched than the remainder of the film. Such non-uniformity was quantified for Examples 1–13 by calculating the Relative Standard Deviation of the MDR, expressed as the ratio of the standard deviation of the six local MDR measurements to the mean value of the six local MDR measurements. It will be readily appreciated that, when an unstretched cast film of uniform thickness is employed as a starting material, the Relative Standard Deviation of the MDR stands also as an indirect qualitative measure of the finished film thickness uniformity, as a relatively large local stretch ratio will result in a local thin spot, all else being equal. It will also be appreciated that other direct and indirect measurement methods exist for quantifying nonuniformity of the film. The method used herein is meant to be illustative and should not be regarded as limiting.

Tensile Properties:

Tensile test specimens were cut from the stretched film specimens of each of the Examples and tested in a Sintech tensile tester (Stoughton, Mass). Each tensile test specimen was 1.25 cm in width and 14 cm in length. An initial jaw separation, or gauge length, of 5.08 cm and an initial crosshead speed of 2.54 cm/min was used. A secondary speed of 50.8 cm/min was used after a deformation of 3% strain was reached. Ten tensile test specimens, all cut along the film MD, were taken from one stretched film specimen and tested, for each stretched film Example. Analogous measurements were performed in the TD, with the exception that only 7, rather than 10, tensile specimens could be cut from each film specimen, due to the smaller dimensions of the stretched film specimens in the machine direction. The Tensile Elongation-to-Break values based on the initial gauge length of the tensile specimen were reported. In addition, the area under the tensile stress-strain curves was reported as the Volumetric Tensile Energy to Break. All reported tensile values are the averages of the 10 (MD) or 7 (TD) tensile specimens.

Comparative Examples are Designated by Numbers Having the Prefix "C"

Example C1

MD-Under-Biased Stretching.

Figure 6:
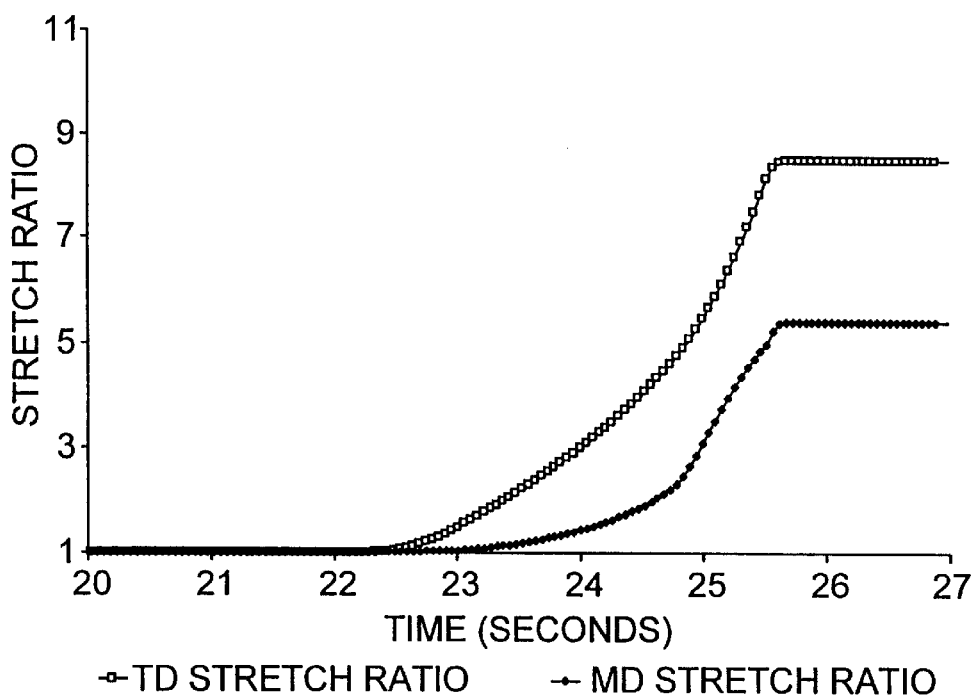
FIG. 6 is a plot of the time-dependent component stretching profiles of Example C1.
Figure 7:
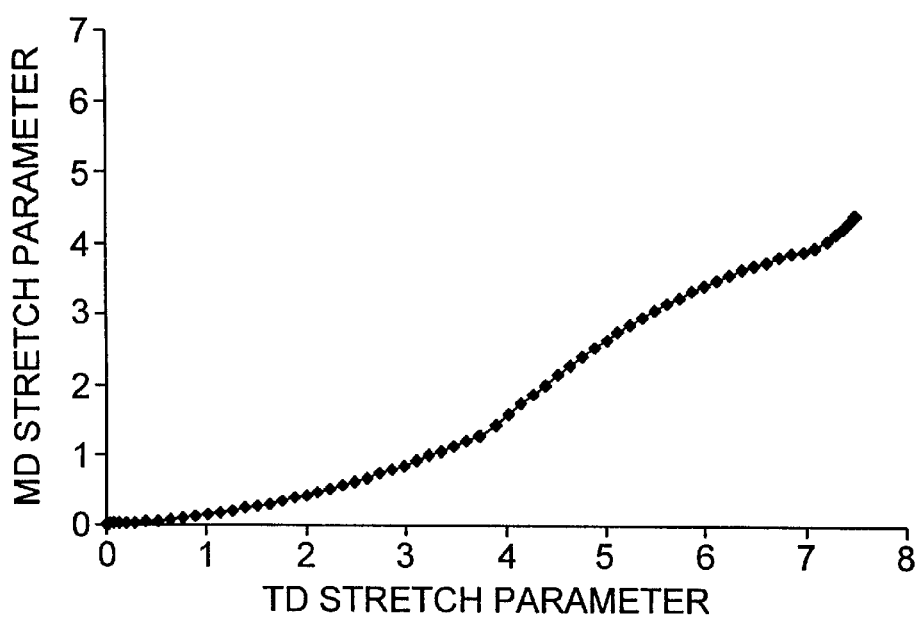
FIG. 7 is a plot of the stretching profile of Example C1.

Stretching was done at an oven temperature of 160° C. The time-dependent component stretching profiles describing the progression of the global MDR and TDR with time for Example C1 are shown in FIG. 6 and the Stretch Profile is shown in FIG. 7. The values of the parameters of the stretch profile and the results of the Stretch Uniformity and Tensile tests are shown in Table 1. This is a case of MD-Under-Biased stretching.

Example C2

Near-Proportional Stretching.

Figure 8:
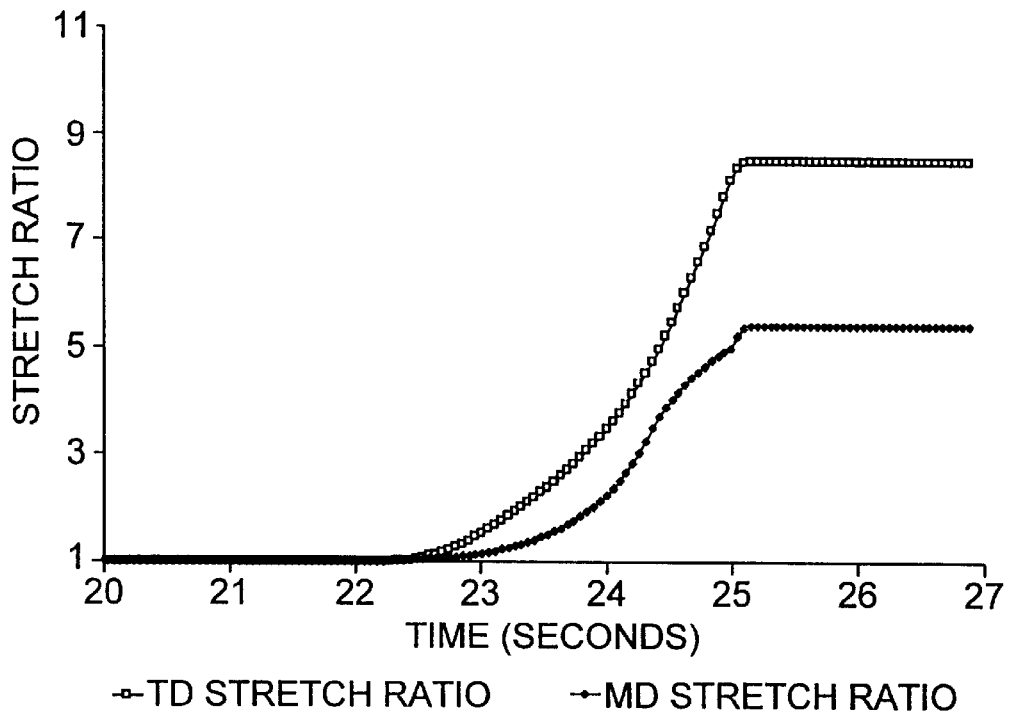
FIG. 8 is a plot of the time-dependent component stretching profiles of Example C2.
Figure 9:
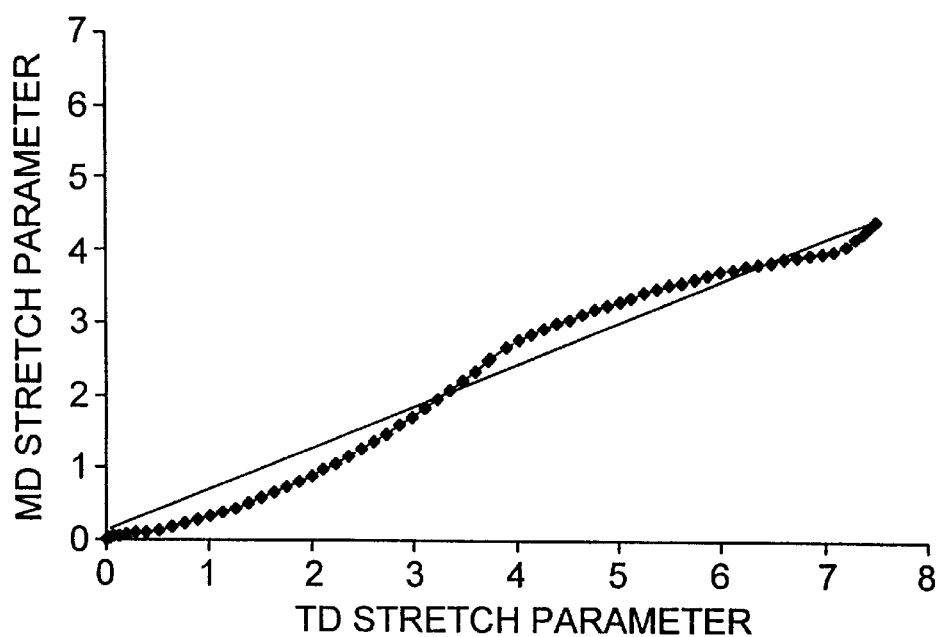
FIG. 9 is a plot of the stretching profile of Example C2.

Stretching was done at an oven temperature of 160° C. The time-dependent component stretching profiles describing the progression of the global MDR and TDR with time for Example C2 are shown in FIG. 8. and the Stretch Profile is shown in FIG. 9.

Example 3
MD-Over-Biased Stretching.

Figure 10:
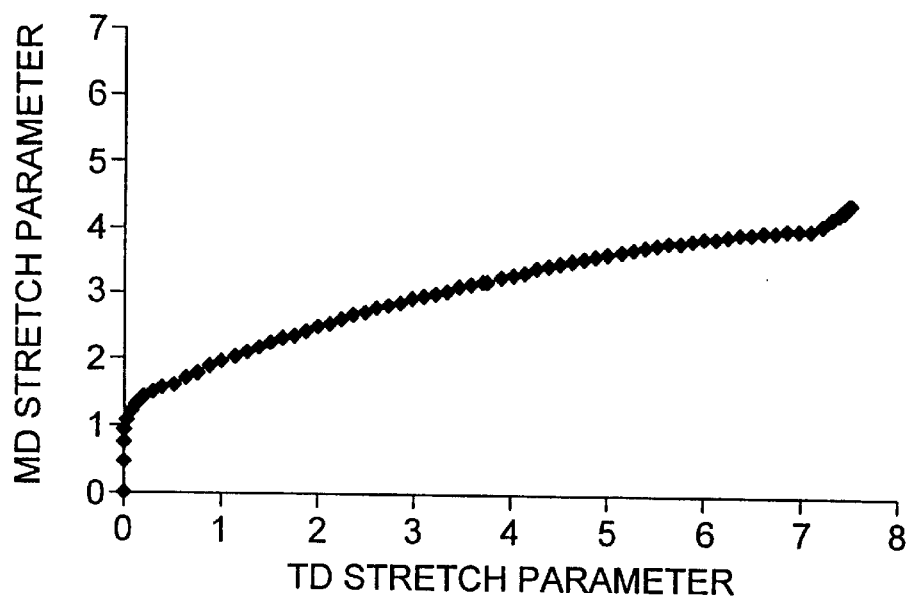
FIG. 10 is a plot of the stretching profile of Example 3.

Stretching was done at an oven temperature of 160° C. The Stretch Profile describing the progression of the global MDR and TDR for Example 3 is shown in FIG. 10.

Example 4
MD-Over-Biased Stretching.

Figure 11:
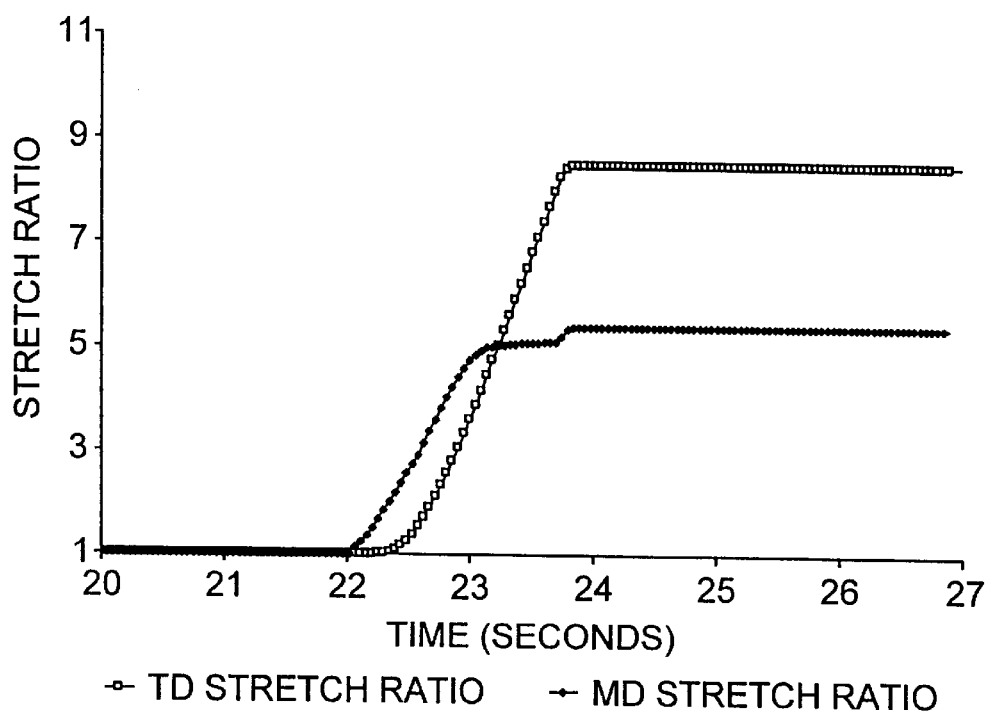
FIG. 11 is a plot of the time-dependent component stretching profiles of Example 4.
Figure 12:
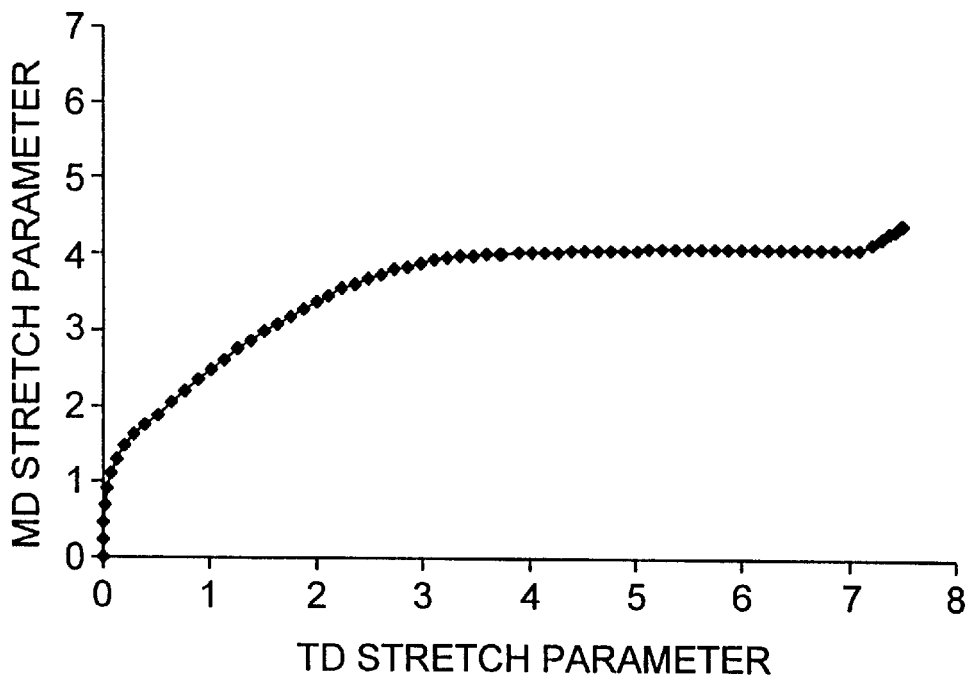
FIG. 12 is a plot of the stretching profile of Example 4.

Stretching was done at an oven temperature of 160° C. The time-dependent component stretching profiles describing the progression of the global MDR and TDR with time for Example 4 are shown in FIG. 11 and the Stretch Profile is shown in FIG. 12.

Example 5
MD-Over-Biased Stretching.

Figure 13:
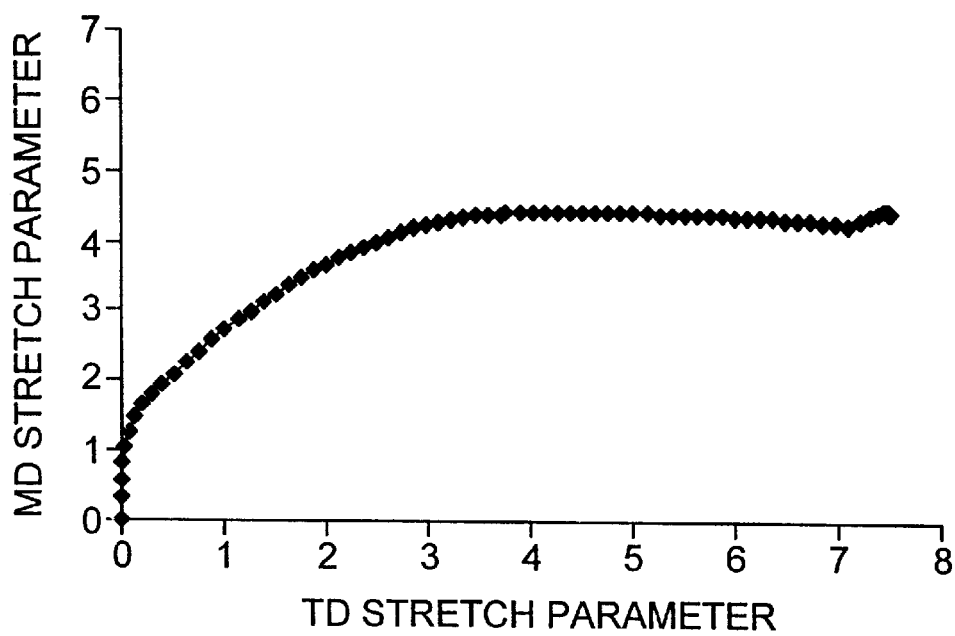
FIG. 13 is a plot of the stretching profile of Example 5.

Stretching was done at an oven temperature of 160° C. The Stretch Profile describing the progression of the global MDR and TDR for Example 5 is shown in FIG. 13.

Example 6
MD-Over-Stretch Stretching.

Figure 14:
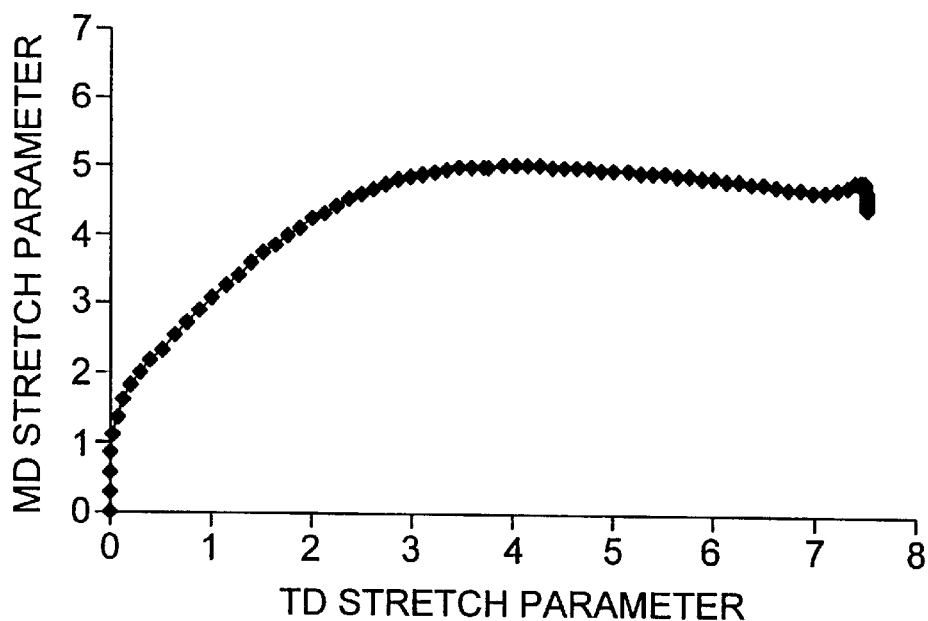
FIG. 14 is a plot of the stretching profile of Example 6.
Figure 15:
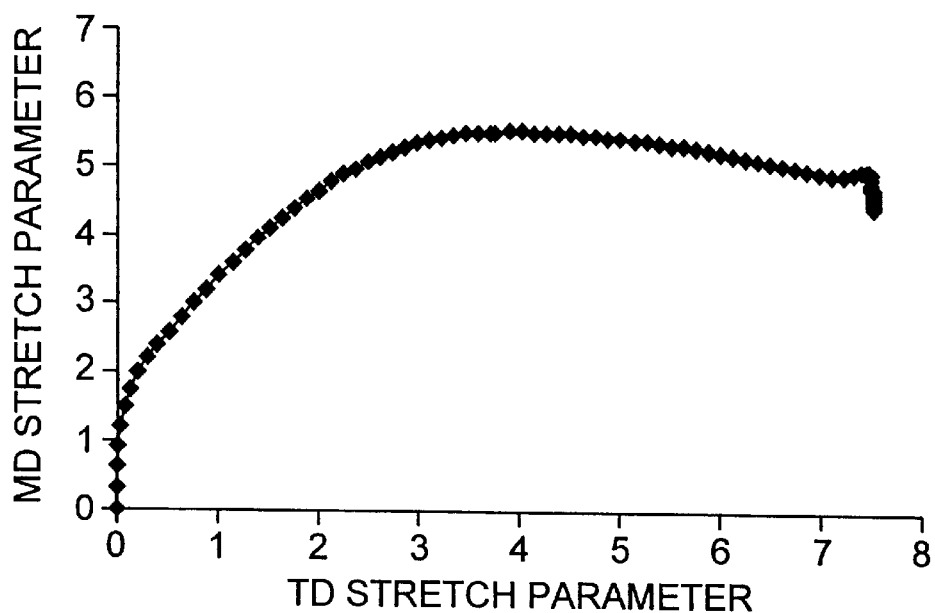
FIG. 15 is a plot of the stretching profile of Example 7.

Stretching was done at an oven temperature of 160° C. The Stretch Profile describing the progression of the global MDR and TDR for Example 6 is shown in FIG. 14.

Examples 7–10

Figure 16:
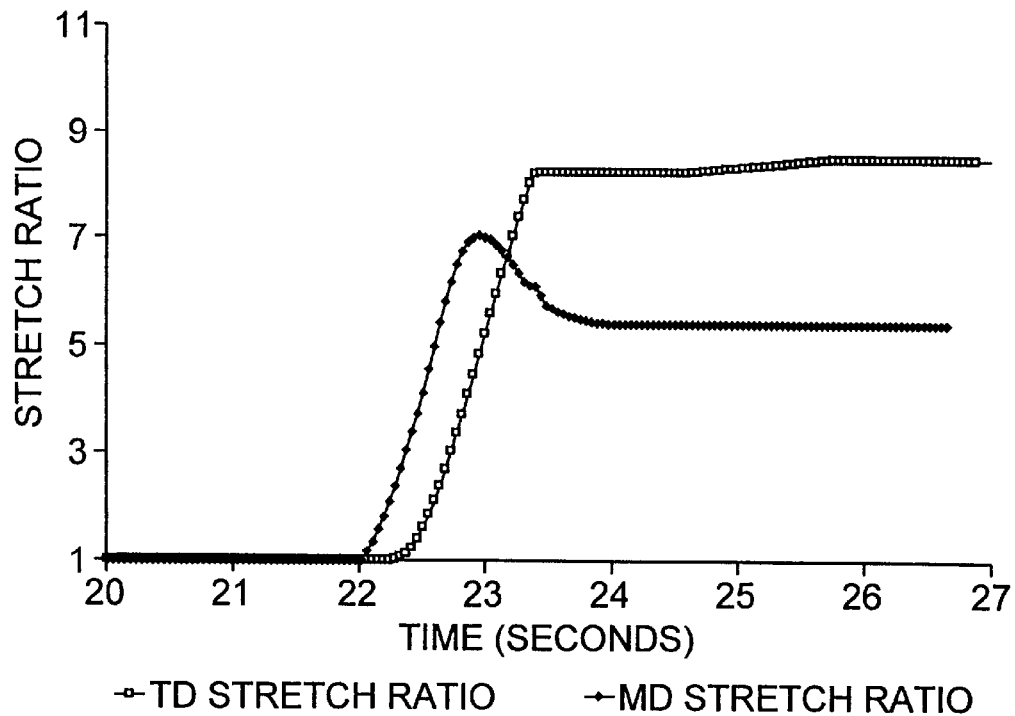
FIG. 16 is a plot of the time-dependent component stretching profiles of Example 8.
Figure 17:
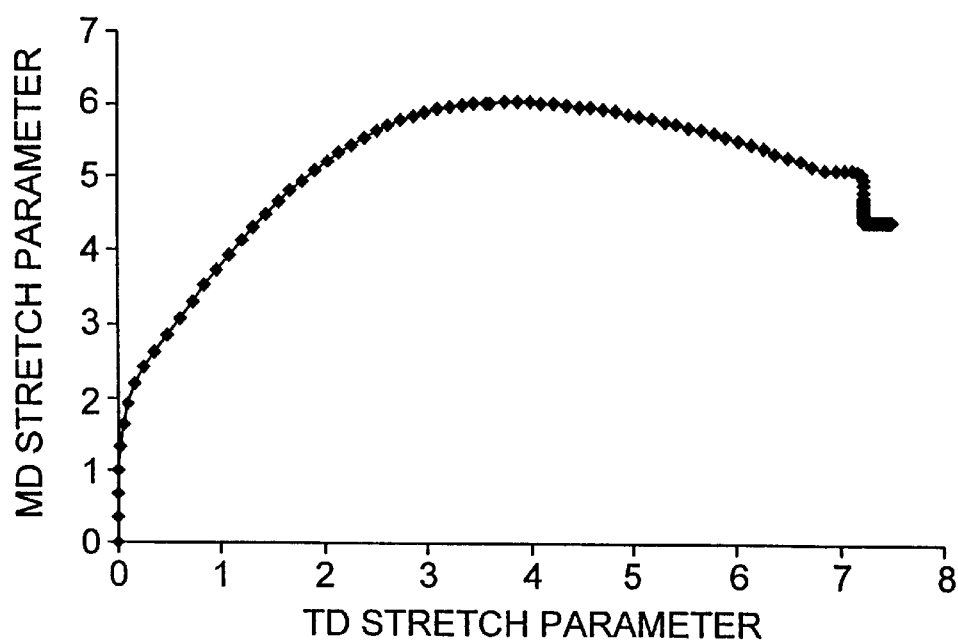
FIG. 17 is a plot of the stretching profile of Example 8.
Figure 18:
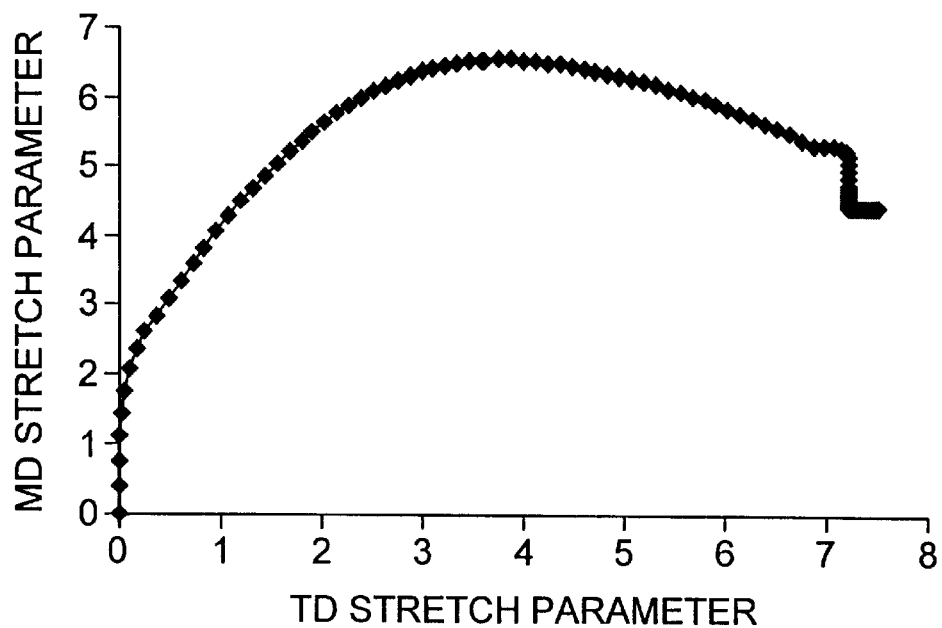
FIG. 18 is a plot of the stretching profile of Example 9.
Figure 19:
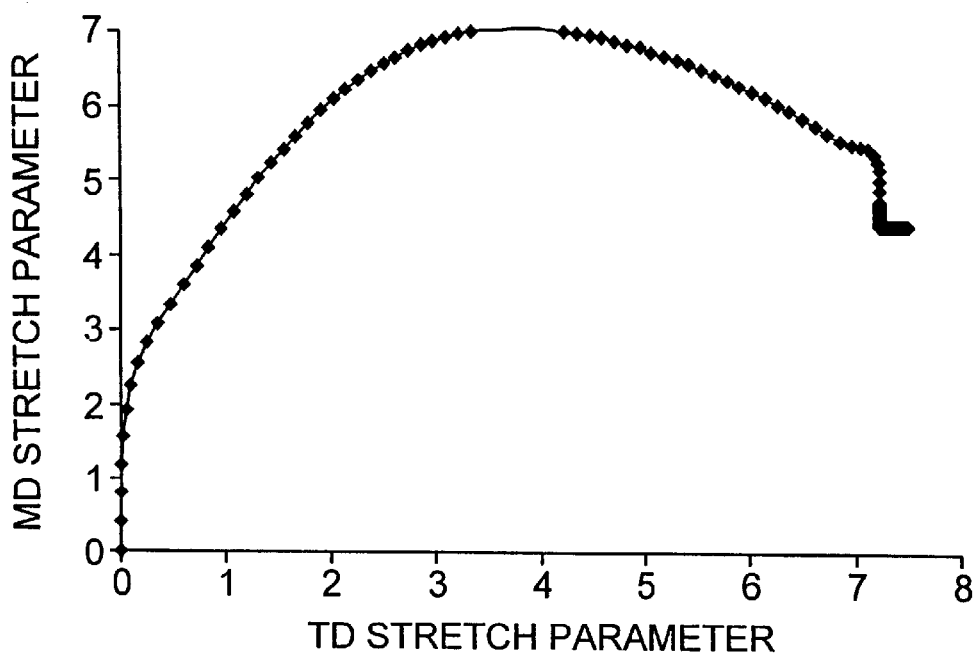
FIG. 19 is a plot of the stretching profile of Example 10.

MD-Over-Stretch Stretching.
Stretching was done at an oven temperature of 160° C. The Stretch Profiles describing the progression of the global MDR and TDR for Examples 7–10 are shown in FIGS. 15, 17, 18, and 19, respectively. For illustrative purposes, the corresponding time-dependent component stretching profiles describing the progression of the global MDR and TDR with time for Example 8 are shown in FIG. 16.

Example 11
Stretching at a Different Temperature.

Example 11 was performed identically to Example 7, except that the stretching was done at an oven temperature of 155° C.

Examples 12–13
Alternative Profiles.

Figure 20:
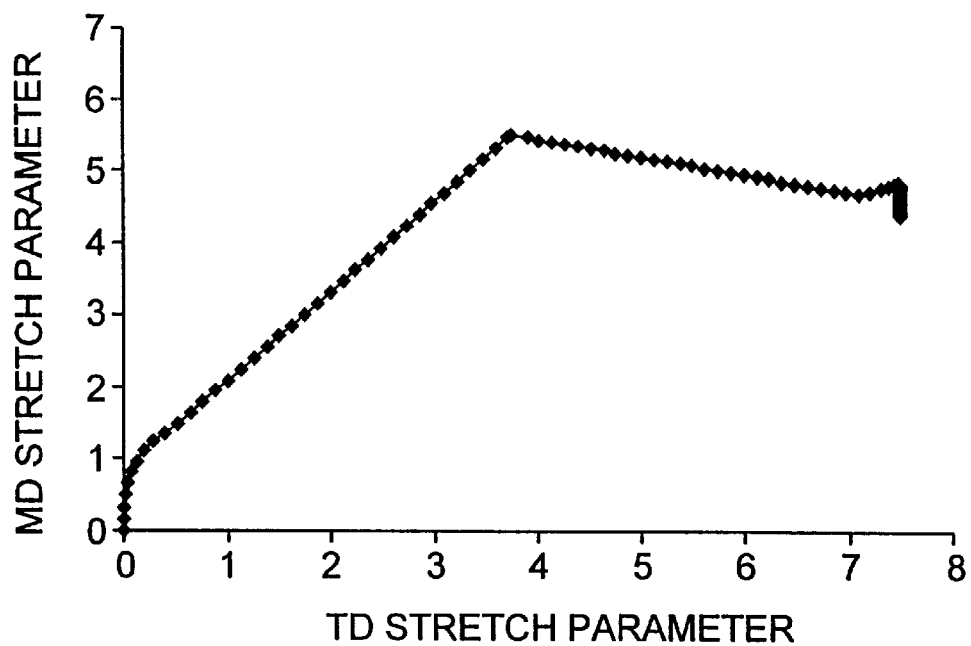
FIG. 20 is a plot of the stretching profile of Example 12.

Example 12 was performed similarly to Example 11, at an oven temperature of 155° C. and with equivalent final MD stretch parameter, final TD stretch parameter, and attaining the same percent MD stretch parameter at 50% TD stretch parameter. However, Example 12 differed from Example 11 in the ratio of the area B of the Stretch Profile to the area A of the proportional stretch profile. The Stretch Profile describing the relative progression of the global MDR and TDR is shown in FIG. 20.

Figure 21:
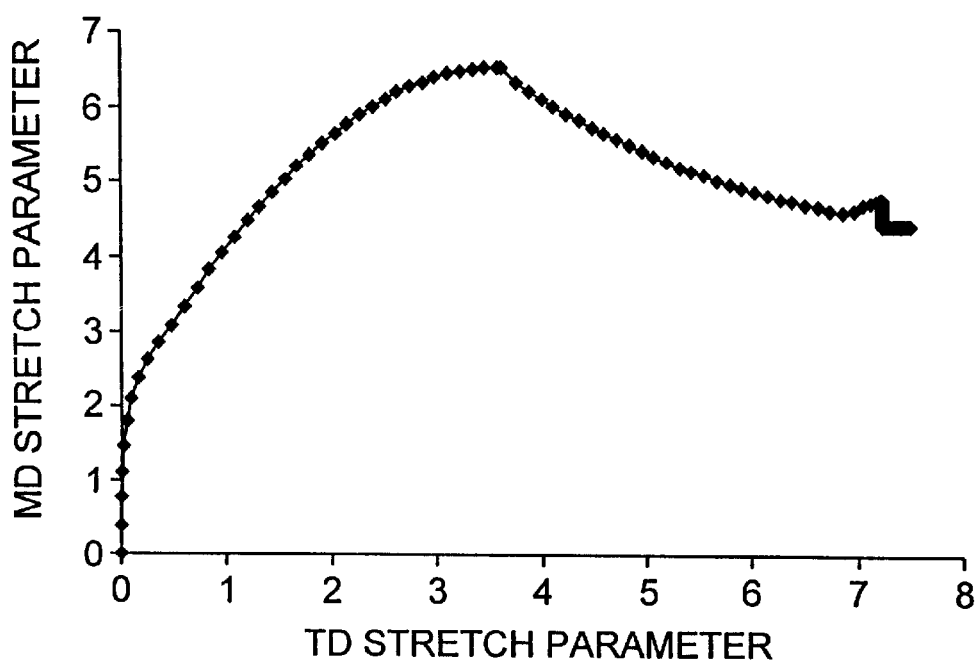
FIG. 21 is a plot of the stretching profile of Example 13.

Example 13 was performed similarly to Example 9, at an oven temperature of 160° C. and with equivalent final MD stretch parameter, final TD stretch parameter, and attaining the same percent MD stretch parameter at 50% TD stretch parameter. However, Example 13 differed from Example 9 in the ratio of the area B of the Stretch Profile to the area A of the proportional stretch profile. The Stretch Profile describing the relative progression of the global MDR and TDR is shown in FIG. 21.

Details regarding the stretch profiles and conditions of the Examples, along with results indicating stretch uniformity, elongation to break, and energy to break are reported in Table 1.

TABLE 1

(MD).

| Ex. | Temp. (° C.) | % MD Stretch Parameter at: 25% TD Stretch Parameter | % MD Stretch Parameter at: 50% TD Stretch Parameter | Stretch Profile Area Ratio | MDR Relative Std. Dev. (%) | MD Elong. to Break (%) | MD Energy to Break (in-lb/in$^3$) |
|---|---|---|---|---|---|---|---|
| C1 | 160 | 7 | 30 | 0.78 | 66.0 | 61 | 13,900 |
| C2 | 160 | 18 | 57 | 1.01 | 47.0 | 71 | 15,500 |
| 3 | 160 | 57 | 73 | 1.39 | 41.5 | 112 | 22,300 |
| 4 | 160 | 74 | 91 | 1.69 | 5.0 | 134 | 28,200 |
| 5 | 160 | 82 | 100 | 1.82 | 4.2 | 134 | 20,100 |
| 6 | 160 | 93 | 114 | 2.02 | 4.7 | 132 | 28,100 |
| 7 | 160 | 104 | 125 | 2.23 | 8.5 | 134 | 19,800 |
| 8 | 160 | 116 | 136 | 2.33 | 2.6 | 137 | 25,600 |
| 9 | 160 | 125 | 148 | 2.58 | 9.4 | 122 | 18,500 |
| 10 | 160 | 135 | 159 | 2.74 | 2.4 | 142 | 27,400 |
| 11 | 155 | 104 | 125 | 2.23 | 7.7 | 164 | 25,800 |
| 12 | 155 | 72 | 125 | 1.90 | 7.2 | 140 | 20,800 |
| 13 | 160 | 126 | 148 | 2.33 | 6.7 | 142 | 20,500 |

(TD)

| Ex. | Temp. (° C.) | % MD Stretch Parameter at: 25% TD Stretch Parameter | % MD Stretch Parameter at: 50% TD Stretch Parameter | Stretch Profile Area Ratio | TDR Relative Std. Dev. (%) | TD Elong. to Break (%) | TD Energy to Break (in-lb/in$^3$) |
|---|---|---|---|---|---|---|---|
| C1 | 160 | 7 | 30 | 0.78 | 3.2 | 53 | 15,400 |
| C2 | 160 | 18 | 57 | 1.01 | 7.7 | 34 | 6,970 |

TABLE 1-continued

| 3  | 160 | 57  | 73  | 1.39 | 6.5 | 49 | 14,700 |
|----|-----|-----|-----|------|-----|----|--------|
| 4  | 160 | 74  | 91  | 1.69 | 4.7 | 50 | 16,100 |
| 5  | 160 | 82  | 100 | 1.82 | 5.4 | 39 | 10,900 |
| 6  | 160 | 93  | 114 | 2.02 | 3.5 | 55 | 17,400 |
| 7  | 160 | 104 | 125 | 2.23 | 2.2 | 47 | 14,900 |
| 8  | 160 | 116 | 136 | 2.33 | 3.9 | 47 | 15,700 |
| 9  | 160 | 125 | 148 | 2.58 | 5.4 | 43 | 13,800 |
| 10 | 160 | 135 | 159 | 2.74 | 4.1 | 34 | 9,200  |
| 11 | 155 | 104 | 125 | 2.23 | 5.2 | 43 | 12,800 |
| 12 | 155 | 72  | 125 | 1.90 | 5.5 | 50 | 15,400 |
| 13 | 160 | 126 | 148 | 2.33 | 8.1 | 44 | 14,600 |

It can be seen from the results that a marked improvement in the values of MD elongtion to break and MD energy to break occurs at stretch profiles in which the ratio of the area under the stretch profile curve to the area under the proportional stretch profile is at least approximately 1.4; and at which at least approximately 75% or more of the final MD stretch parameter is attained before 50% of the final TD stretch parameter is attained. It is also seen from the results that a marked increase in MD stretch uniformity occurs at stretch profiles in which the ratio of the area under the stretch profile curve to the area under the proportional stretch profile is at least approximately 1.7; and at which at least approximately 90% or more of the final MD stretch parameter is attained before 50% of the final TD stretch parameter is attained. It is expected that uniformity of stretch provides uniformity of film properties and characteristics.

The tests and test results described above are intended solely to be illustrative, rather than predictive, and variations in the testing procedure can be expected to yield different numerical results.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A method of biaxially stretching a polymeric film according to an overbias or overstretch stretch profile to a final first direction stretch parameter and a final second direction stretch parameter, wherein the final first direction stretch parameter is less than the uniaxial natural stretch parameter, the method comprising the steps of:
    a) imparting a sufficiently high temperature to the film to allow biaxial stretch;
    b) biaxial tenter stretching the film to a peak first direction stretch parameter that is at least 1.3 times the final first direction stretch parameter, wherein the final first direction stretch parameter is no larger than the final second direction stretch parameter; and
    c) subsequent to step b), retracting the film in the first direction from the peak first direction stretch parameter to the final first direction stretch parameter,
    wherein uniformity of properties is attained in the film in the first direction by steps a) through c) despite the final first direction stretch parameter being less than the uniaxial natural stretch parameter.

2. The method of claim 1, wherein the first direction is the MD and the second direction is the TD.

3. The method of claim 1, wherein the final first direction stretch parameter is less than the natural stretch parameter for a proportional stretch profile.

4. The method of claim 1, wherein step b) further comprises grasping the film with a plurality of clips along the opposing edges of the film and propelling the clips in the machine direction along clip guide means that diverge in the transverse direction.

5. The method of claim 1, wherein step b) further includes stretching the film to more than 100% of the final first direction stretch parameter before no more than 50% of the final second direction stretch parameter is attained.

6. The method of claim 1, wherein step b) further includes stretching the film to the peak first direction stretch parameter before no more than 50% of the final second direction stretch parameter is attained.

7. The method of claim 1, wherein the final second direction stretch parameter is greater than the uniaxial natural stretch parameter.

8. The method of claim 1, wherein the final second direction stretch parameter is greater than the natural stretch parameter for a proportional stretch profile.

9. The method of claim 1, wherein a portion of the retraction is performed simultaneously with a portion of the second direction stretch.

10. The method of claim 9, wherein all of the retraction is performed simultaneously with a portion of the second direction stretch.

11. The method of claim 1, wherein the peak first direction stretch parameter is at least 1.4 times the final first direction stretch parameter.

12. The method of claim 11, wherein the peak first direction stretch parameter is at least 1.5 times the final first direction stretch parameter.

13. The method of claim 1 wherein step b) further includes stretching the film to at least 75% of the final first direction stretch parameter before no more than 50% of the final second direction stretch parameter is attained.

14. The method of claim 13, wherein step b) further includes stretching the film to at least 90% of the final first direction stretch parameter before no more than 50% of the final second direction stretch parameter is attained.

15. The method of claim 1, wherein:
    i) a straight line between the point defining zero stretch parameter and the point defining the final first direction stretch parameter and the final second direction stretch parameter represents a proportional stretch profile and defines a proportional stretch area; and
    ii) the curve representing the overbias or overstretch stretch profile between the point defining zero stretch parameter and the point defining the final first direction stretch parameter and the final second direction stretch parameter defines an area at least 1.4 times the proportional stretch area.

16. The method of claim 15, wherein:

the curve representing the overbias or overstretch stretch profile between the point defining zero stretch parameter and the point defining the final first direction stretch parameter and the final second direction stretch parameter defines an area at least 1.7 times the proportional stretch area.

17. The method of claim 1, wherein the film comprises a thermoplastic film.

18. The method of claim 17, wherein the film comprises a semi-crystalline film.

19. The method of claim 18, wherein the film comprises polyolefin.

20. The method of claim 19, wherein the film comprises polypropylene.

21. The method of claim 1, wherein a portion of the first direction stretch is performed simultaneously with a portion of the second direction stretch.

22. The method of claim 21, wherein a portion of the retraction is performed simultaneously with a portion of the second direction stretch.

23. The method of claim 22, wherein all of the retraction is performed simultaneously with a portion of the second direction stretch.

24. The method of claim 21, wherein at least 10% of the final stretch in the first and second directions is performed simultaneously.

25. The method of claim 24, wherein at least 25% of the final stretch in the first and second directions is performed simultaneously.

26. The method of claim 25, wherein at least 40% of the final stretch in the first and second directions is performed simultaneously.

27. A method of biaxially stretching a polypropylene film according to an overbias or overstretch stretch profile to a final first direction stretch parameter and a final second direction stretch parameter, wherein the final first direction stretch parameter is no greater than the final second direction stretch parameter, and wherein the final first direction stretch parameter is less than the natural stretch parameter for a proportional stretch profile and is less than the uniaxial natural stretch parameter, the method comprising the steps of:

a) imparting a sufficiently high temperature to the film to allow biaxial stretch;

b) biaxial stretching the film to a peak first direction stretch parameter that is at least 1.3 times the final first direction stretch parameter, wherein a portion of the peak first direction stretch is performed simultaneously with a portion of the second direction stretch; and c) subsequent to step b), retracting the film in the first direction from the peak first direction stretch parameter to the final first direction stretch parameter;

wherein uniformity of properties is attained in the film in the first direction by steps a) through c) despite the final first direction stretch parameter being less than the uniaxial natural stretch parameter.

* * * * *

UNITED STATES PATENT AND TRADEMARK OFFICE
CERTIFICATE OF CORRECTION

PATENT NO. : 6,303,067 B1
DATED : October 16, 2001
INVENTOR(S) : Wong, Chiu P.

It is certified that error appears in the above-identified patent and that said Letters Patent is hereby corrected as shown below:

Column 3,
Line 5, "step 1))" should read -- step b) --.
Line 32, "steps of: )" should read -- steps of: a) --.
Line 45, "comprises a the film a film" should read -- comprises a film --.

Column 6,
Line 54, "Backing is 22" should read -- Backing 22 --.

Column 7,
Line 58, delete "and" just prior to "a melting point".

Column 8,
Line 1, "alkylbenzene," should read -- allylbenzene --.
Line 21, "copolymers (," should read -- copolymers, --.
Line 31, "thee" should read -- these --.
Line 40, "limonene." should read -- limonene, --.

Signed and Sealed this

Seventeenth Day of December, 2002

JAMES E. ROGAN
*Director of the United States Patent and Trademark Office*